United States Patent
Hawksworth

(10) Patent No.: US 10,774,787 B2
(45) Date of Patent: Sep. 15, 2020

(54) COUPLING

(71) Applicant: Goodrich Actuation Systems Limited, Solihull, West Midlands (GB)

(72) Inventor: Andrew Hawksworth, Shropshire (GB)

(73) Assignee: GOODRICH ACTUATION SYSTEMS LIMITED, Solihull, West Midlands (GB)

( * ) Notice: Subject to any disclaimer, the term of this patent is extended or adjusted under 35 U.S.C. 154(b) by 694 days.

(21) Appl. No.: 15/591,636

(22) Filed: May 10, 2017

(65) Prior Publication Data

US 2018/0038314 A1 Feb. 8, 2018

(30) Foreign Application Priority Data

Aug. 8, 2016 (EP) ..................................... 16183215

(51) Int. Cl.
*F02K 1/80* (2006.01)
*F16B 7/10* (2006.01)
*F15B 15/14* (2006.01)
*F15B 15/16* (2006.01)
*F02K 1/76* (2006.01)

(52) U.S. Cl.
CPC ............ *F02K 1/80* (2013.01); *F15B 15/1409* (2013.01); *F15B 15/1466* (2013.01); *F15B 15/1471* (2013.01); *F15B 15/16* (2013.01); *F15B 15/165* (2013.01); *F16B 7/105* (2013.01); *F02K 1/763* (2013.01)

(58) Field of Classification Search
CPC ........ F02K 1/80; F02K 1/763; F15B 15/1409; F15B 15/1466; F15B 15/1471; F15B 15/16; F15B 15/165; F16B 7/10; F16B 7/105

See application file for complete search history.

(56) References Cited

U.S. PATENT DOCUMENTS

| 2,993,472 | A | 7/1961 | Einsiedler | |
| 8,733,228 | B2 * | 5/2014 | Eckelt | F15B 11/121 92/52 |
| 8,931,253 | B2 * | 1/2015 | Baudu | F02K 1/72 244/110 B |
| 9,206,765 | B2 * | 12/2015 | Vauchel | F02K 1/72 |
| 9,447,700 | B2 * | 9/2016 | McMahon | F01D 25/28 |
| 9,476,384 | B2 * | 10/2016 | Arnaud | F02K 1/763 |
| 9,494,108 | B2 * | 11/2016 | Gormley | F02K 1/763 |

(Continued)

FOREIGN PATENT DOCUMENTS

| FR | 3063532 A1 * | 9/2018 | ......... F16H 25/2454 |
| GB | 2395693 A | 6/2004 | |
| JP | 5728132 B2 | 6/2015 | |

OTHER PUBLICATIONS

European Search Report for Application No. 16183215.9-1754 dated Feb. 1, 2017, 7 Pages.

*Primary Examiner* — Jonathan P Masinick

(74) *Attorney, Agent, or Firm* — Cantor Colburn LLP

(57) ABSTRACT

A coupling e.g. for an actuator, comprises a housing which is preferably in the form of a ring mounted around the end of the outer rod and which can be mounted to a component e.g. a cowl being deployed. Within the housing of the coupling is provided a ring disk. This is sized and arranged within the housing such that there is some clearance between the ring disk and the housing so as to permit some eccentric movement.

5 Claims, 3 Drawing Sheets

(56) References Cited

U.S. PATENT DOCUMENTS

2013/0284010 A1* 10/2013 Allard .................... F15B 15/16
                                                        91/157
2015/0354500 A1* 12/2015 Caruel ................... F02K 1/763
                                                        60/226.2
2019/0271282 A1*  9/2019 Hawksworth .......... F02K 1/763

* cited by examiner

COUPLING

FOREIGN PRIORITY

This application claims priority to European Patent Application No. 16183215.9 filed Aug. 8, 2016, the entire contents of which is incorporated herein by reference.

TECHNICAL BACKGROUND

The present disclosure relates to a coupling, particularly an eccentric coupling for, for example, an actuator assembly.

BACKGROUND

Many mechanical systems require a coupling component or structure for coupling two or more parts of an assembly and to allow or prevent various degrees of movement between coupled parts.

Coupling structures are known, for example, for joining components of an actuator assembly. Depending on the operation and structure of the actuator assembly, couplings or joints may be designed to accommodate some translation of movement between the two components joined by the coupling, so as to avoid 'force fighting' or damage to one or both components due to the force on one of the components.

The coupling of this disclosure will be specifically described in relation to an actuator such as commonly used in aircraft e.g. for deploying/moving cowls and flaps. The coupling may, however, find a very wide range of applications and is not limited to this specific field. There is a general need for an eccentric coupling that permits some movement of a first component when a force is applied to a second component coupled to the first.

BRIEF DESCRIPTION

In one aspect, there is provided a coupling assembly comprising a housing configured to be fixedly attached to a fixed component, and a moveable element arranged inside the housing and arranged to be fixed, in use, to a first moveable component, wherein the moveable element is arranged in the housing such that it has freedom of movement within the housing in an eccentric path in two dimensions in response to a force exerted on the first moveable component.

In another aspect, there is provided an assembly comprising a first moveable component and a second moveable component, moveable relative to the first, and a coupling defined above, such that a force transmitted to the first moveable component by movement of the second moveable component is accommodated by eccentric movement of the moveable element within the housing.

The assembly is preferably an actuator wherein the first and second moveable components are components arranged to actuate, respectively, first and second moveable parts.

In one example, the first and second moveable component comprise telescopically arranged components such as a first and second (or outer and inner) rod.

The actuator may be an actuator for use in a TRAS system or other aircraft system where the two moveable components actuate two different system parts such as cowls, flaps, doors or the like.

The coupling housing is preferably in the form of a ring and the moveable element is preferably in the form of a ring or annular disk mounted within the housing for eccentric movement within the housing.

Preferred embodiments will now be described by way of example only and with reference to the drawings.

DETAILED DESCRIPTION

Figure 1:
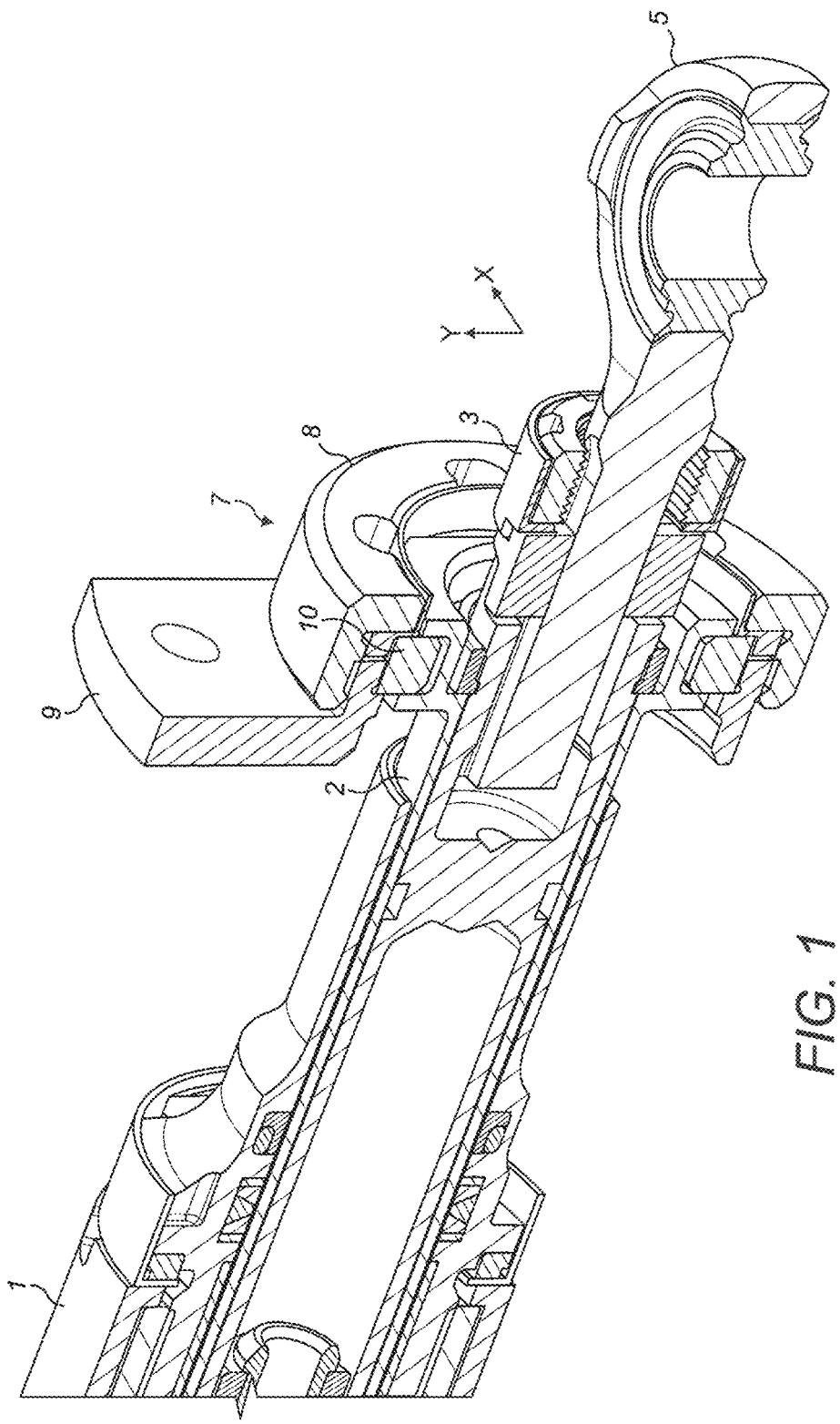
FIG. 1 is a perspective cut-away view of an actuator incorporating an eccentric coupling in accordance with the disclosure.
Figure 2:
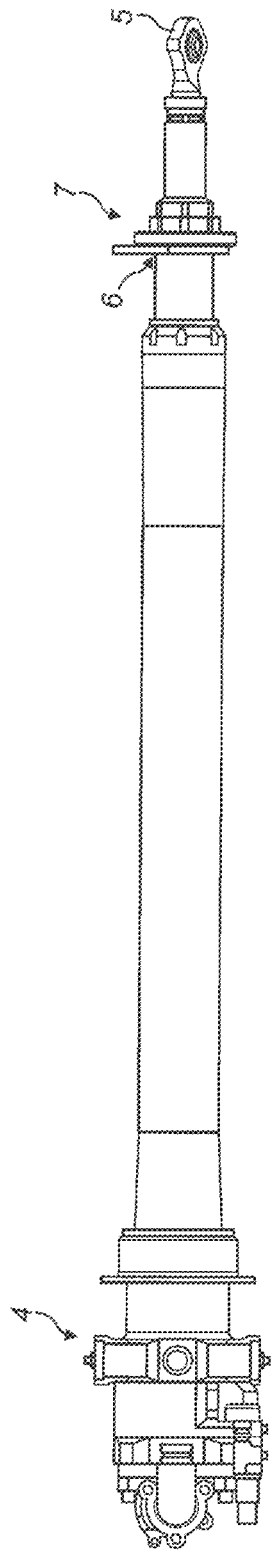
FIG. 2 is a schematic side view of an actuator incorporating an eccentric coupling in accordance with the disclosure.

The coupling of the disclosure will now be described with reference to the drawings, by way of example only, in a very specific context of an actuator. Many mechanical systems comprise moveable parts driven by actuators. As an example, in aircraft, actuators drive moveable parts such as doors, flaps or cowls. One example of the use of such actuators is in a thrust reverser actuation system (TRAS) where actuators are used to deploy flaps or cowls to decelerate an aircraft. When not in use, the actuators are used to withdraw or stow the flaps/cowls. Actuators may be hydraulic or pneumatic, or, increasingly, electric (or a combination of types).

In traditional TRAS, flaps are driven by movement of a piston or rod of the actuator moving axially relative to a cylindrical housing. One end of the housing is attached to a fixed structure e.g. via a gimbal and the other end is open. The rod extends out of the open end of the cylinder and has an end e.g. an eye end that is attached to the movable cowl in a manner in which universal angular movement can be accommodated. To open the flap, the rod is driven axially out from the cylinder. To stow the cowl, the rod is retracted into the cylinder.

A TRAS usually has an actuator to operate the thrust reverser doors and the blocker doors are operated from a linkage mechanism from the thrust reverser doors, or by some other separate mechanism. The use of separate actuators for each door or cowl adds to the weight, space requirements, risk of faults and maintenance requirements in an aircraft.

An actuator has been developed comprising a dual rod assembly wherein, within the cylindrical housing 1, are mounted two relatively moveable rods or pistons 2,3, one inside the other. Such an assembly is able to deploy and/or stow two cowls e.g. the thrust reverser door and the blocker door using a single, relatively compact unit, as opposed to two separate mechanisms or actuators as in conventional systems.

In such a dual rod system, again, one end of the housing 1 is attached to a fixed structure, e.g. via a gimbal 4 and the remote end of the actuator is attached to a moveable part/cowl e.g. via an eye end 5. In between these two fixation points, though, is a third fixation point for the free end of the second rod/piston. An example can be seen in the figures. The cylindrical housing 1 accommodates an outer rod 2 and an inner rod 3, both rods axially moveable relative to the housing and to each other. The end 6 of the outer rod extending from the open end of the cylinder is fixed to a first moveable part/cowl, flap, door etc. e.g. via a gimbal or bearing (not shown). The end of the inner rod 2 is fixed to a second moveable cowl/flap/door e.g. via the eye end 5 mentioned above. Actuation of the outer rod will cause deployment of the first cowl; actuation of the inner rod will cause deployment of the second cowl.

It can be seen that, compared to a conventional single stroke actuator with fixation points at the two ends, a dual stroke system requires an additional, third fixation point for the outer piston. This third fixation point requires additional degrees of freedom to ensure that e.g. movement of the Nacelle will not induce additional loads onto the actuator. In other words, angular movement of the fixation of the inner rod for deploying the second cowl should not be transferred to the fixation of the end of the outer rod with the first cowl and so the third fixation point needs to accommodate such angular movement.

The solution provided by the present disclosure is to provide an eccentric coupling 7 at the third fixation point such as to permit movement e.g. a planar movement, of the outer rod 2 relative to its fixation to the first cowl when angular movement of the inner rod 3 is transmitted.

Figure 3A:
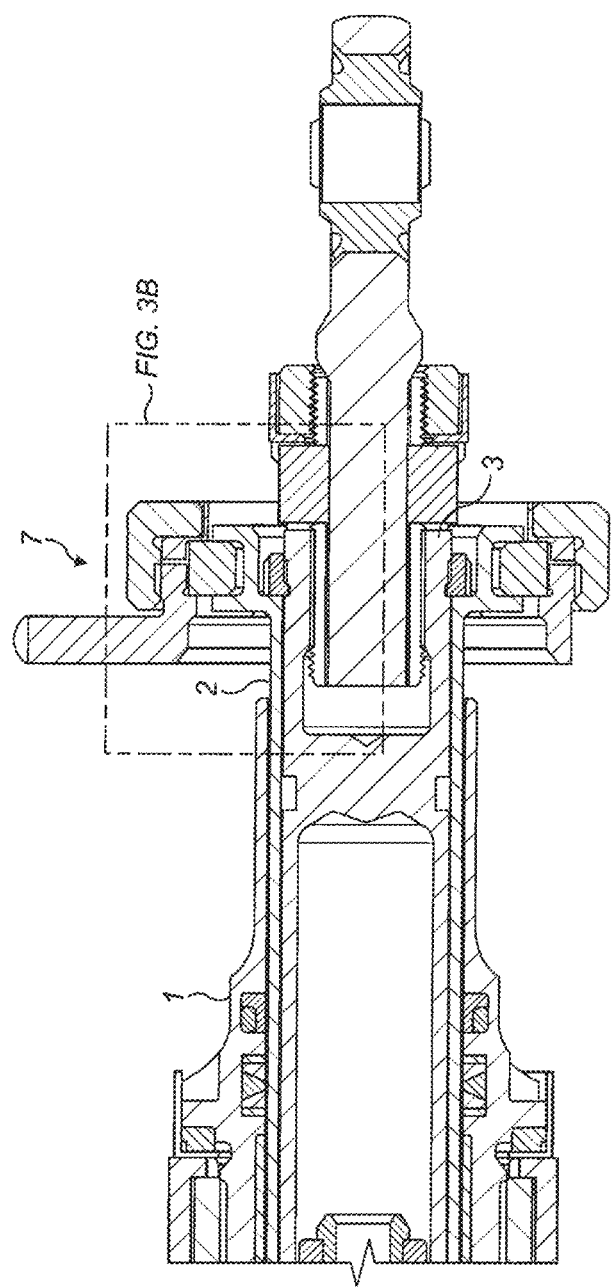
FIG. 3A is a sectional view of a part of an actuator incorporating an eccentric coupling in accordance with the disclosure.
Figure 3B:
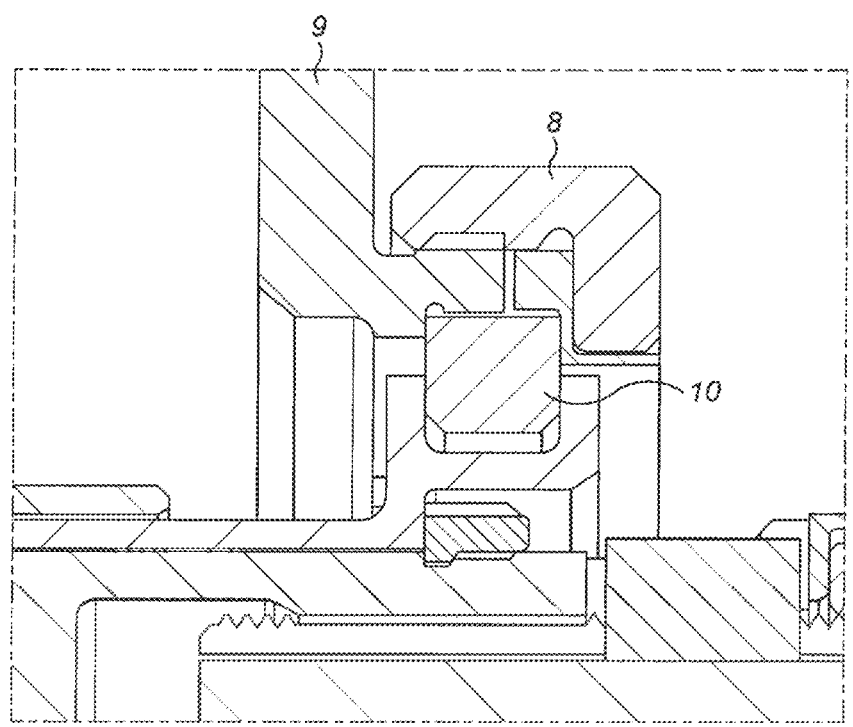
FIG. 3B is a detail from FIG. 3A showing the coupling in more detail.

The coupling 7 can be best seen with reference to FIG. 1 and FIG. 3B. In this example, the coupling comprises a housing 8 which, here, is in the form of a ring mounted around the end of the outer rod 2 and which can be mounted to the component e.g. cowl being deployed by the outer rod by means of a coupling member such as a coupling bracket 9 which can, in turn, be mounted to the cowl either directly or, more preferably, via a steady bearing or a gimbal. Within the housing 8 of the coupling 7 is provided a ring disk 10. This is sized and arranged within the housing such that there is some clearance between the ring disk and the housing so as to permit some movement in the xy plane shown by the x and y arrows in FIG. 1.

In use, therefore, the outer rod 2 determines the position of the cowl or other component to which it is attached. The inner rod 3 is driven to control the position of another component, cowl etc. Movement of the inner rod will, however, create forces acting on the outer rod. The ring disk and coupling will, because of the clearance, permit eccentric movement to allow for these forces without transmitting them to the cowl driven by the outer rod.

In the embodiment described and shown, the coupling has a circular ring shape. Other shapes are, of course, possible and these will, at least to some extent be determined by the shape and form of the actuator components.

Such a coupling is advantageous for any actuators having three or more fixation points on a single axis.

The invention claimed is:

1. An actuator assembly comprising;
a first moveable component; and
a second moveable component, moveable relative to the first moveable component;
wherein the first and second moveable components are arranged to actuate, in use, respectively, first and second moveable parts;
wherein the first moveable component is an outer rod and the second moveable component is an inner rod arranged for telescopic movement within the outer rod; and
a coupling assembly, the coupling assembly comprising:
a housing configured to be fixedly attached to a fixed component, and
a moveable element arranged inside the housing and arranged to be fixed to the outer rod,
wherein the moveable element is arranged in the housing such that it has freedom of movement within the housing in an eccentric path in two dimensions in response to a force exerted on the outer rod component such that a force transmitted to the first moveable component by movement of the second moveable component is accommodated by eccentric movement of the moveable element within the housing.

2. The actuator assembly coupling of claim 1, wherein the housing is in the form of a ring and the moveable element comprises a ring or annular disk mounted within the housing for eccentric movement relative to the housing.

3. The assembly of claim 1, wherein the eccentric movement is in a plane perpendicular to the axial direction of the outer and inner rods.

4. The assembly of claim 1, wherein the coupling assembly is attached to the inner rod.

5. The assembly of claim 1, wherein the actuator assembly is an actuator assembly for a TRAS system for use in an aircraft and wherein the first and second moveable parts are first and second flaps of the aircraft.

* * * * *